H. M. SMITH.
COOKING APPARATUS.
No. 170,199. Patented Nov. 23, 1875.
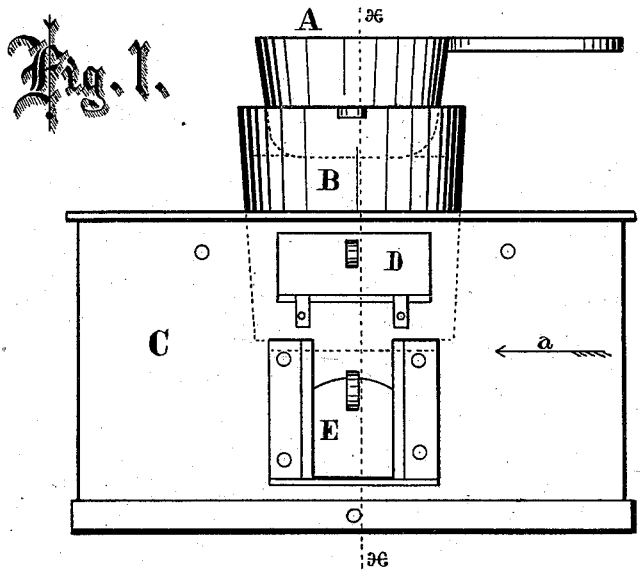
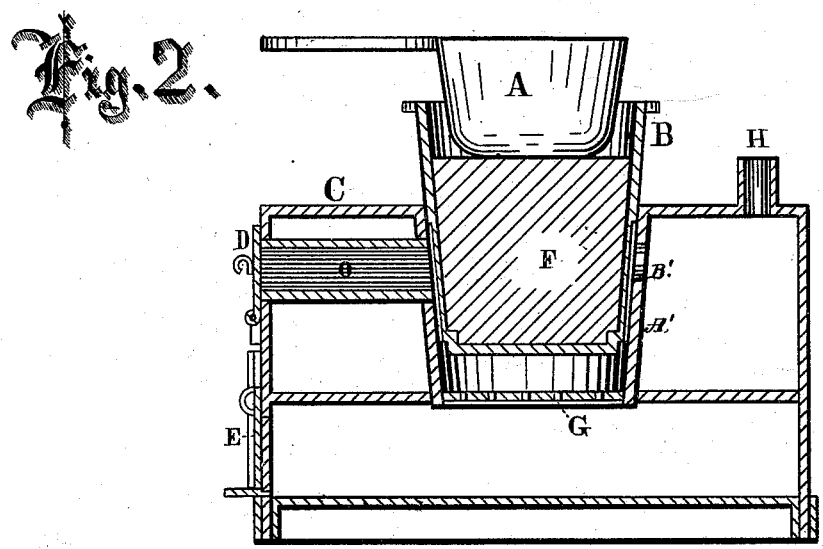

UNITED STATES PATENT OFFICE.

HORATIO M. SMITH, OF CHICAGO, ILL., ASSIGNOR OF TWO-THIRDS HIS RIGHT TO MOSES W. LESTER AND FRANKLIN LESTER, OF SAME PLACE.

IMPROVEMENT IN COOKING APPARATUS.

Specification forming part of Letters Patent No. 170,199, dated November 23, 1875; application filed September 12, 1874.

*To all whom it may concern:*

Be it known that I, HORATIO M. SMITH, of Chicago, in the county of Cook and State of Illinois, have invented a new and useful Improvement in Cooking Apparatus, of which the following is a specification:

In the annexed drawings, Figure 1 is an elevation of my improved cooking apparatus; Fig. 2, a central sectional elevation taken on line $x$, Fig. 1, looking in the direction of dart $a$, and showing the handle of the cooking utensil at right angles to its position in Fig. 1.

The object of the present invention is to provide a simple and cheap apparatus, whereby cooking and heating may be performed very speedily, and in a superior manner.

The nature of my invention consists in a melting-receptacle, combined with a portable charcoal-furnace, which is provided with an ash-pit, smoke-flue, a conical seat for the melting-receptacle, and a supply-flue, by which the grate can be supplied with fuel by raising the melting-receptacle, there being a space between the seat and receptacle to admit air to pass between them and out through a port in the cone.

B represents a melting-receptacle, which may be of metal or any suitable material, (in this case it is metal,) and of such size as to receive in its top part a cooking utensil of any desired form. In this case the melting-receptacle is supported by a heating-furnace, C, with doors D E, grate G, flue H, and supply-flue O, the latter admitting air or fuel to the receptacle B by means of a door, D. There is also a conical seat, A', to support the melting-receptacle, and a port, B', to allow air to pass out. The receptacle B is supplied with lead, F, in such a quantity as to be about three-fourths full when melted, the melting being done by coal on grate G, so as to keep the lead F at about 700° Fahrenheit, which is below the point of any considerable oxidation.

Lying on the lead F, so heated, oysters, clams, and shell-fish may be roasted in a very few seconds. Potatoes and other articles may be fried in lard heated on the lead F. Water may be heated and tea and coffee prepared by setting the vessels containing them respectively on the molten lead, and sad-irons heated. Frying, broiling, and stewing may be done by the use of the utensil A.

Care must be taken to watch the articles cooking, closely, inasmuch as the heat is so intense, it requires but a few seconds to cook some articles, and a few minutes to cook others.

In some instances I use charcoal sprinkled on the lead, to prevent oxidation, when too high a heat has been obtained.

I claim as new—

A portable cooking apparatus, consisting of the outside case C, ash-pit, supply-flue O, grate G, port B'', conical support A', and flue H, combined with the melting-receptacle B, as and for the purpose set forth.

HORATIO M. SMITH.

Witnesses:
G. L. CHAPIN,
JOHN H. ELLIOTT.